United States Patent [19]

Araki

[11] Patent Number: 4,832,151
[45] Date of Patent: May 23, 1989

[54] MUFFLER COVER FOR INTERNAL COMBUSTION ENGINE

[75] Inventor: Tsuneo Araki, Tokyo, Japan

[73] Assignee: Kioritz Corporation, Mitaka, Japan

[21] Appl. No.: 230,292

[22] Filed: Aug. 9, 1988

[30] Foreign Application Priority Data

Aug. 25, 1987 [JP] Japan ............................. 62-128864[U]

[51] Int. Cl.$^4$ ................................................ F01N 7/00
[52] U.S. Cl. .................................... 181/211; 181/230; 181/240; 181/243; 181/282; 180/89.2
[58] Field of Search .............. 181/200, 204, 240, 241, 181/243, 244, 245, 282, 283, 263, 211, 212; 165/133, 134.1; 126/83; 180/89.2; 60/299, 320

[56] References Cited

U.S. PATENT DOCUMENTS

| 4,433,542 | 2/1984 | Shimura | 181/243 X |
| 4,478,310 | 10/1984 | Harter | 181/241 |
| 4,609,067 | 9/1986 | Gonwa | 181/261 |

OTHER PUBLICATIONS

*Outdoor Power Equipment*, Aug./1986, GIA Show Issue Excerpts.

*Primary Examiner*—B. R. Fuller
*Attorney, Agent, or Firm*—Browdy & Neimark

[57] ABSTRACT

A muffler cover has a plurality of air holes formed therein. At least part of the air holes is formed in such a manner as to have configurations which indicate characters or symbols, and at least those portions of the muffler facing the portions of the muffler cover that correspond to the air holes indicating the characters or symbols are coated with a heat resistant coating.

1 Claim, 1 Drawing Sheet

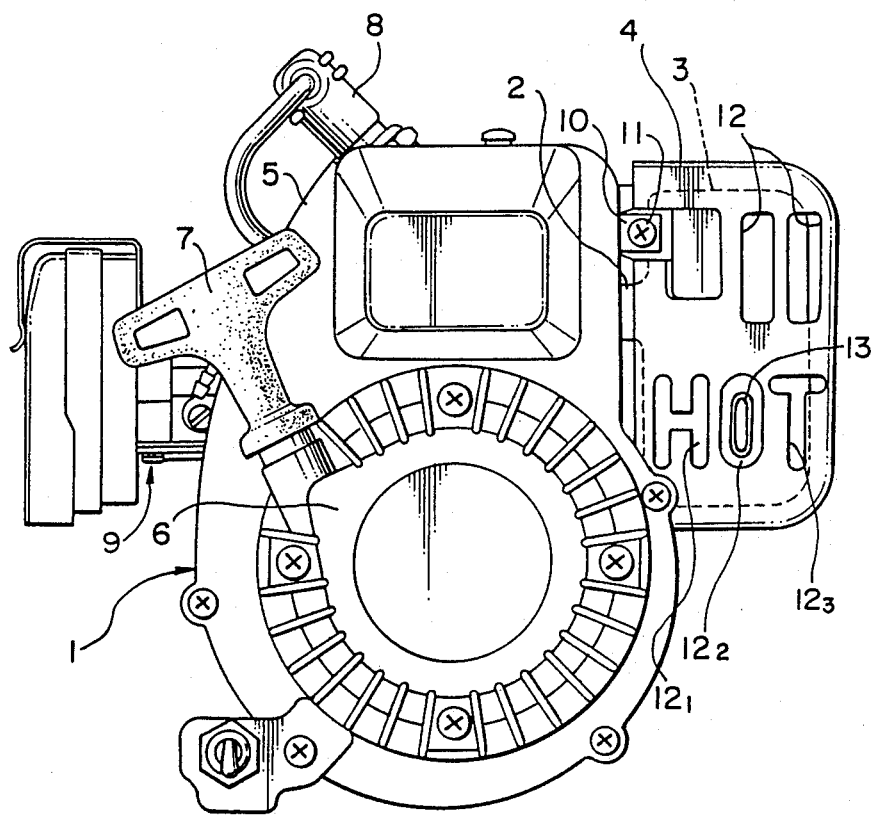

MUFFLER COVER FOR INTERNAL COMBUSTION ENGINE

BACKGROUND OF THE INVENTION

The present invention relates to a muffler cover for an internal combustion engine.

A muffler is connected to the exhaust port of an internal combustion engine for discharging exhaust gases to the outside. Since the muffler is at a high temperature during operation by being heated by the heat of exhaust gases and it can be dangerous, it is covered by a cover. However, the cover itself is at a considerably high temperature. Therefore, there is a risk that, when a person happens to come into direct contact with the cover, he may get burnt. There is a high possibility of an operator coming into contact with the muffler cover particularly when the internal combustion engine is provided as the power source in a working machine which is used as it is, for instance, carried by the operator, because, in such a case, the muffler cover is positioned very close to the operator.

SUMMARY OF THE INVENTION

Accordingly, it is an object of the present invention to provide a muffler cover for an internal combustion engine which is capable of calling operators' attention to the fact that the muffler cover is at a high temperature, thereby preventing the operators from coming into contact with the high-temperature muffler cover, and which is yet simply-structured, easily-manufactured, and inexpensive.

According to the present invention, there is provided a muffler cover covering a muffler connected to an exhaust port of an internal combustion engine, the muffler cover being formed with a plurality of air holes, wherein at least part of the air holes is formed in such a manner as to have configurations which indicate characters or symbols, and at least those portions of the muffler facing the portions of the muffler cover that correspond to the air holes indicating the characters or symbols are coated with a heat resistant coating.

With the above-stated arrangement of the present invention, the air holes formed in the muffler cover provide, in addition to their original function of ventilating the muffler so as to cool it, a further function of enabling people to clearly recognize the characters or symbols indicated by the air holes, thereby giving a caution to people against touching the high-temperature muffler cover. The arrangement of the air holes is such that the characters or symbols they indicate are contrasted with the surface of the muffler cover because the color of those surface portions of the muffler facing the air holes is seen through the holes. Thus, according to the present invention, at least part of the plurality of air hole formed in the muffler cover is formed with configurations which indicate characters or symbols, and at least those portions of the muffler facing the air hole portions indicating the characters or symbols are coated with a heat resistant coating. The air holes serve to allow air to flow therethrough so as to cool the muffler, and they also serve to enable people to clearly recognize the characters or symbols indicated by the air holes by virtue of the arrangement in which the characters or symbols indicated by the air holes are put into contrast with the surface of the muffler cover by the color of the coating applied to the muffler, whereby people can be given a cation against touching the high-temperature muffler cover. Therefore, the muffler cover in accordance with the present invention is capable of preventing people from getting burnt or hurt by coming into contact with the muffler cover, and it is simultaneously simply-structured, easily-manufactured, and inexpensive.

BRIEF DESCRIPTION OF THE DRAWINGS

The single drawing is a front view of an internal combustion engine on which a muffler cover in accordance with one embodiment of the present invention is mounted.

PREFERRED EMBODIMENT OF THE INVENTION

The present invention will be described hereunder with respect to one embodiment thereof which is illustrated in the single drawing.

In this embodiment, the present invention is applied to an internal combustion engine which is particularly suitable for use in a portable working machine. An internal combustion engine 1 has a muffler 3 connected to an exhaust port 2 of a cylinder (not shown) of the engine 1. The muffler 3 is covered by a muffler cover 4 which is made of, for instance, a thin steel sheet plated with chromium. The internal combustion engine may be of any suitable type of those normally used. In the illustrated example, the engine 1 is a two-cycle internal combustion engine, and it is provided with an engine cover 5 accommodating therein the cylinder vertically disposed at an upper position and a crank case (not shown) which is disposed at a lower position and on which a crankshaft is rotatably mounted. The crankshaft is connected to a piston within the cylinder via a connecting rod so as to be driven thereby. The crankshaft is also connected to a recoil-type starter 6. When a rope handle 7 of the starter 6 is pulled to drive the recoil-type starter 6, the internal combustion engine 1 is started. In the drawing, a reference numeral 8 denotes a spark plug mounted on the cylinder of the engine 1, while a reference numeral 9 denotes a fuel supply device.

The muffler cover 4 is fixed to the engine cover 5 by means of screws 11 passed through mounting pieces provided on both sides of the engine cover 5 and threaded into threaded holes formed in the muffler cover 4. A plurality of air holes 12 are formed in the muffler cover 4. Air is introduced into the inside of the muffler cover 4 from the outside through these air holes 12 and is allowed to flow around the muffler 3 so as to cool the muffler 3. One air hole $12_1$ of the air holes 12 is formed as a hole having the shape of the alphabetical character "H". An air hole $12_2$ is provided on the right side of the air hole $12_1$ adjacent thereto, and is formed as an "O"-shaped hole. A tail pipe 13 of the muffler 3 is positioned at the central portion of the air hole $12_2$, providing the effect of clarifying the "O"-shape of this air hole. An air hole $12_3$ is provided further on the right side of the air hole $12_2$ adjacent thereto and is formed as a "T"-shaped hole. In this way, the above-described three air holes $12_1$, $12_2$, and $12_3$ are arranged in such a manner as to indicate the letters of the English word "HOT". These letters can therefore be recognized by operators, thereby calling the operators' attention to the fact that the muffler cover 4 is at a high temperature and that it is dangerous to touch.

Further, if the surface of the muffler cover 4 is plated with chromium, as mentioned before, it is preferred that at least the surface of those portions of the muffler 3 facing the air holes 12$_1$, 12$_2$, and 12$_3$ of the muffler cover 4 is coated with a heat resistant coating of such a suitable color as black, blue, or yellow which can put the air holes 12 into contrast with the surface of the muffler cover 4. By the adoption of such a suitable coating, the letters "H", "O", and "T" can be further clearly recognized by operators, thereby positively calling their attention.

The type and the number of the letters indicated by the air holes 12 of the muffler cover 4 are not limited to those of the letters "H", "O", and "T" illustrated above, and any other characters or symbols which are suitable for the purpose may be indicated, through it is preferred that the characters or symbols have certain configurations with which the machining of the air holes is facilitated. Needless to say, the muffler 3 and the muffler cover 4 may alternatively be subjected to surface coating and surface treatment using methods other than those adopted in the foregoing embodiment.

What is claimed is:

1. A muffler cover covering a muffler connected to an exhaust port of an internal combustion engine, said muffler cover being formed with a plurality of air holes, wherein at least part of said air holes is formed in such a manner as to have configurations which indicate characters or symbols, and at least those portions of said muffler facing the portions of said muffler cover that correspond to said air holes indicating said characters or said symbols are coated with a heat resistant coating.

* * * * *